United States Patent Office 2,694,006
Patented Nov. 9, 1954

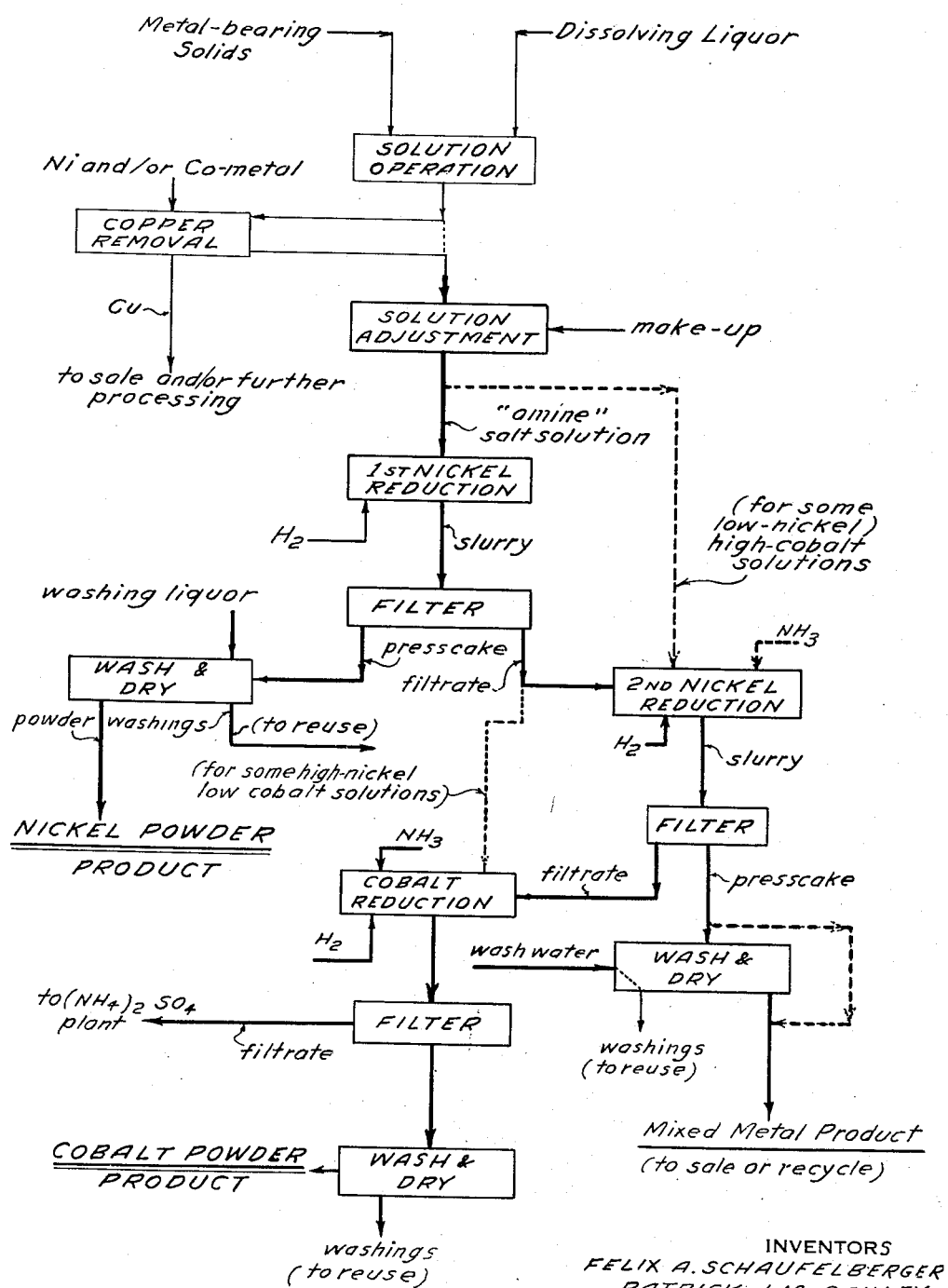

2,694,006

SEPARATION OF NICKEL AND COBALT METAL FROM AMMINE SOLUTION

Felix A. Schaufelberger, Yonkers, and Patrick J. McGauley, Port Washington, N. Y., assignors to Chemical Construction Corporation, New York, N. Y., a corporation of Delaware Application March 14, 1952, Serial No. 276,712

13 Claims. (Cl. 75—108)

This invention relates to the hydrometallurgy of nickel and cobalt. More specifically, it is concerned with the selective separation of cobalt and nickel from aqueous solutions containing dissolved salts of both. Still more specifically, it involves a new method capable of severally collecting cobalt and nickel as a metal powder, each substantially free of the other, from solutions containing soluble salts of both.

Nickel and cobalt metals are very similar in many physical and chemical characteristics. The same is true of their salts and naturally-occurring minerals. Moreover, minerals of both generally occur together in natural deposits and usually cannot be separated by ordinary mineral dressing practices. For these reasons, both metals are generally present, in varying amounts, in any solution resulting from any type of leaching of materials containing cobalt and nickel.

In most ordinary practices, small amounts of cobalt present in nickel ore concentrates, for example, represent little of benefit to the producer of nickel. Very little of that available in such materials is recovered and sold as cobalt metal, primarily because by current methods the cost of separation equals or exceeds the additional value. Much, if not most of the cobalt is lost in the slag from nickel smelting. The remainder is sold as "nickel" in nickel metal bullion or cathodes.

Similarly, small amounts of nickel present in cobalt concentrates, and, therefore, in the "cobalt" solutions after leaching, is of small value. It is generally either discarded, a considerable loss, or is recovered with the "cobalt." In the latter case, the nickel becomes an impurity in the cobalt metal. The producer is generally not paid for it. While certain nickel and cobalt mixed metals are marketable as such, it is usually at a price below the value of the pure metals in separate products.

In conventional metallurgy of nickel and cobalt, the presence of smaller but appreciable quantities of either in sources of the other, i. e., in ores, ore concentrates, scrap metals, plant by-products and the like, presents a serious and difficult problem. This problem has heretofore been variously attacked. However, a generally practicable treatment whereby the bulk of each may be recovered in a separate, relatively pure product has not been offered.

Many processes have been proposed for separation and recovery of cobalt and nickel from mixed electrolytes. Several have been used quite extensively. Most of these processes involve the same two facts, that cobalt is more readily oxidized to the trivalent state than nickel and that cobaltic hydroxide is relatively more insoluble at lower pH values than is nickelous hydroxide. Unfortunately, the necessary staps are complicated and repetitive, the hydroxides are difficult to filter efficiently and the resultant separations are far from perfect. Moreover, most of them also require large quantities of chemical reagents, many of which are non-regenerative. In addition to the effect on costs, this creates a disposal problem.

Several methods of separating nickel and cobalt from ammonium carbonate leach liquors also have been proposed. Most of these involve fractional distillation of the ammonium carbonate. Liquor, at different stages in the process, thereby becomes concentrated with either nickel or cobalt. This liquor may then be removed and treated separately. The residue must also be redissolved and retreated separately. In practice, however, as processing methods, these are economically but little better than electrolyte treatments, nor do they result in any substantially improved product.

Such conventional processes for the production of nickel or cobalt, then, have been found commercially unsatisfactory as too complicated, wasteful or uneconomical or as resulting in products containing undesirably large amounts of the other metal. Neither do they directly produce metal products. The resultant oxides or hydroxides must be further processed to obtain this result.

It is, therefore, the principal object of this invention to provide an improved method capable of separate precipitation of cobalt and nickel, as metals, from solutions containing salts of both. Such a method should not be subject to the objections to the prior practice. Both metals should be economically recovered in acceptable quantity and quality. Such a process should require only the use of commonly-available chemical reagents and preferably only those which may be either regenerated or recovered in the form of valuable by-products.

Surprisingly, the desired objects of the present invention have been achieved in an effective manner in a simple, economical process. A general outline of the separation process may be simply described. A relatively dilute aqueous solution containing cobalt, nickel and usually ammonium salts, usually as sulfates, is prepared. This solution is then treated, at different but increasing elevated temperatures, with ammonia in controlled amounts and with a reducing gas. This precipitates successive products which are separately collected. The first precipitate will comprise low-cobalt content nickel metal powder product. The final product will be the cobalt product containing the bulk of the cobalt.

While it is not intended that the present invention be limited to a particular theory of operation, a consideration at this point of certain factors bearing thereon may be of assistance in defining the field of the invention. Nickel and cobalt salts such as the sulfate dissolved in water produce inherent pH values of about 2–4.5. While the numerical pH limits can not be exactly defined because of the effect of temperature, concentration and the like factors, within this general range, and from such solutions cobalt and nickel ions are not readily susceptible to reduction to metal with a gas. The reduction is not feasible commercially even though not actually physically impossible.

If to the solution there is added a very small amount of some non-complex-forming base such as sodium hydroxide to raise the pH to values approaching neutrality, gas reduction of nickel or cobalt ions to metal can be readily initiated. Once the reaction starts, however, the pH drops and reaction stops. There is no economically feasible method of controlling this low degree of acidity by continuous further addition of base. Moreover, the addition of more base to prevent this increase in acidity may cause the precipitation of hydroxides or basic salts resulting in the contamination of the metal product.

However, according to the present invention, it has been found that if to such a metal salt solution a sufficient of "free" or "unneutralized" ammonia, i. e., ammonia in excess of that needed to neutralize any free acid present, is added, the reaction can be made to start and continue. Some gas-reducible complex is believed to form between the ammonia and the metal. For reference, it may be postulated to have the form $Me(Am)_x$ wherein $x$ may vary from just above one to as high as six or more depending upon the amount of ammonia added. The (Am) initially present as ($NH_3$) in the complex is then available to form ($NH_4$)+ with any H+ ions liberated by the reduction and thus permit the reduction to proceed.

In any case, salts of a number of metals, including cobalt and nickel, may be economically reduced to metal, with a suitable reducing gas, from solutions so-treated. Other metals include, for example, copper, silver and cadmium as shown in the copending application for U. S. Letters Patent, Serial No. 276,710, filed of even date by F. A. Schaufelberger, one of the present inventors. Organic amines of certain types also may be employed in the same way instead of ammonia. Accordingly, in this discussion, for simplification of reference, such complexes will be referred to generically as "ammine" complexes.

However, in the present instance more than simple precipitation of the metal is required. It should be eventually completely recovered. It must be in commercially-acceptable grade. It must be in useful condition, i. e., as a useful, easily-collected product and not as a deposit on the wall of the reduction vessel. It must be a powder, suitable for further metallurgical use when washed and dried.

Primarily, however, the cobalt-nickel separation must be effective. The nickel product should not contain more than about 1.0% by weight of cobalt and preferably not more than 0.5%. The cobalt product may be taken in various ways but should in turn be recovered with a low nickel content.

Cobalt and nickel precipitation is accomplished, as noted above, by treatment of the metal salt solution at elevated temperatures and superatmospheric pressures with both a reducing gas and with ammonia, or an amine, in amount sufficient to insure complex formation. The metal salts to be treated will usually be sulfates. Usually, too, they will have been obtained by oxidation leaching of sulfide or sulfide-arsenide ore concentrates and removing other metals or impurities from the leach liquor. However, the acidic radical is not critical in the present process. So long as the metal amine complex is maintained in solution, the anion may be varied. For example, it may be a hydroxyl ion, as where straight ammonia leaching is used; or a carbonate, as where ammoniacal carbonate leach liquors are used.

In addition to ammonia, organic amines which form soluble complexes or similar types may be used. Examples thereof may include alkly amines, such as mono-, di- and trimethyl amine and its homologues and alkylene diamines, such as ethylene diamine and its homologues. Certain cyclic amines such as pyridine, pyrol, aniline and the like are also feasible. However, ammonia for economic reasons will be the most common choice. It will be taken as illustrative for this discussion.

Instead of using such reaction conditions as are best suited for most complete metal precipitation, as shown in the above-noted copending application, conditions are chosen to favor selective precipitation. The conditions which should be controlled include, for example, reaction temperature, reaction pressure and ratio of metal to ($NH_3$) in the complex. Another factor which must be considered is the Ni:Co ratio. While for any original Ni:Co ratio each of the controls may be varied within certain limits, there is a set of optimum conditions and in the aggregate their control permits adequate separation.

Nickel, by means of these controls, is preferentially precipitated. Its reduction is continued to the point at which the residual dissolved nickel-cobalt mol ratio becomes such that the rate of cobalt precipitation is too high. It is stopped before the weight percent content of cobalt in the precipitate exceeds the desired limit. A product which is suitable for sale as high-purity nickel powder is collected at this point.

If the original dissolved nickel and dissolved cobalt ratio was from about 1:1 to about 5:1 slightly more drastic conditions for reduction are then applied to the residual solution and the bulk of the remaining dissolved nickel is precipitated, while minimizing the amount of cobalt which may co-precipitate therewith. This product also is collected.

Finally, conditions best suitable for cobalt precipitation are applied. This results in precipitation of the balance of the cobalt as a product containing the balance of the nickel. These conditions are maintained until the solution is substantially barren in cobalt.

The separation process, then, is one of raising the nickel-cobalt ratio, in the first product particularly, far above that in the feed. The effect is a disproportionation which, as will be shown, can be employed on feed materials containing nickel and cobalt in varied ratios.

It is believed that the invention may be more readily understood with reference to the accompanying drawing. In the latter is delineated a simplified flow diagram showing one useful embodiment of the invention.

Certain factors should be noted before further discussion. For example, the present process will often comprise part of an overall treatment of nickel-cobalt-copper ores. Methods are known for the elimination or recovery of such extraneous constituents as the iron, arsenic, excess sulfur, insoluble gangue, zinc, lead, gold, silver and the like therefrom. Methods are also known for leaching the resultant concentrates to convert the nickel and cobalt minerals, together with any copper in the ore, to a mixture of soluble non-ferrous metals salts. Copper, in particular, if present, will constitute a valuable product and much or all of it will have been removed by some suitable method. Except to the extent that such known processes may serve as sources of compounds to be treated in the present process, this invention is not concerned therewith.

The nature of the cobalt and nickel compounds to be treated according to the present process may be widely varied. They will, however, comprise soluble metal salts, usually sulfates, or compounds easily solubilized. They may be in solid form or in solution. In the latter case a purification may be desirable. This may be a simple filtration or may extend to crystallization. The "solution operation" shown in the flowsheet, therefore, may be done specifically for this process or may have occurred in some prior treatment. The actual formation of the solution to be treated, except as to the adjustment of its dissolved content which will be discussed below, forms no part of this invention and accordingly has been given in light lines in the drawing.

Since the present process often will constitute part of an overall process involving copper recovery, there may be some residual copper in the initial salts, or solution of salts. If so, it should be removed to prevent contamination of the nickel product. This may be done in any desired manner. One of the simplest and most economical where but little copper need be removed is to cement the copper. A metal which will not contaminate the present products should be used. Nickel and/or cobalt produced in a prior cycle is best. It will be recovered in this cycle without loss. Except as to the possible use of cobalt and nickel therein, copper removal is not a part of the present process. If not required it may be by-passed, as shown. Accordingly it, too, has been shown in light lines.

As pointed out, in applying the process of the present invention, a factor to be considered is nickel to cobalt ratio in the materials to be treated. The present process is capable of treating ratios over the range in which a separation is desirable. However, it is most efficaceous when the nickel is preponderant. It works well for Ni:Co ratios above about 4:5, with a decreased efficiency at ratios down to about 1:3. While lower ratio concentrates can be handled, in the range wherein cobalt is the largest component, treatment by the process of the copending application, Serial No. 276,711, filed of even date by F. A. Schaufelberger, one of the present inventors. Accordingly, since the typical problems are presented by the case where nickel predominates, that case will be taken for illustrative discussion.

For any original ratio of nickel to cobalt, there are optimum conditions of the other controls which produce best results, i. e., control of reduction temperature, reduction pressure, metal to amine mol ratio, amount and kind of reducing gas, salt concentration, dilution and the like. Generally, preferential reduction of nickel is favored by lower temperatures and pressures and lower amine to metal ratios. The lower amine content cobalt complexes are somewhat more difficult to reduce than those containing three to four amines, whereas nickel reduction becomes feasible for complexes containing above about 1.5 amines.

Further, it is necessary to consider not only the conditions at which reduction may be initiated, but of more importance the terminal conditions, i. e., the optimum conditions at which preferential nickel reduction should be stopped. When nickel is reduced, among others, two changes in the solution conditions occur for which allowance must be made. First, the nickel:cobalt ratio decreases. Secondly, as nickel ions are reduced to elemental metal, the corresponding anions are liberated, in the cases of sulfates and carbonates, the most commonly encountered anions, in equal numbers. In addition the complexing amine is freed and two hydrogen ions are formed. The liberated amine forms a salt of the acid to the extent that both are present. If there is an excess of amine over the two hydrogens, it can be taken up, at least in part by the cobalt which has a greater avidity for the complexing amines. If there is a deficiency the hydrogen ion content and the acidity of the solution will increase. However, the increase need not be in proportion since amine can also be drawn from the cobalt.

From the foregoing discussion it can be appreciated that control of the metal:amine ratio is highly important. The solution must contain enough amine to form soluble metal complexes and, in the case of nickel, a gas-reducible one. There should not be a sufficient amount to form a cobalt complex which is more readily reducible than those formed in the solution when nickel complex contains 1.5–2.5 amines. Therefore, for the initial or "nickel" reduction stage of the present process, the amount of amine added should be kept fairly low. Some added ammonia will be neutralized if the solution is acidic. However, the pH change is not commensurate with that produced when a like total amount of ammonia is added to a similar solution which does not contain a complex-forming metal ion. In the present case, even at somewhat acidic conditions, some complex forms.

This "ratio" may be extended to six, or even higher if so desired, but doing so will increase the pH. According to the present invention, selective precipitation of nickel is favored at lower pH values. It is desirable, therefore, not only to carry out the initial reduction at pH values as low as practical for efficient nickel reduction but also to keep the pH from increasing as the nickel fraction precipitation progresses.

If the initial neckel:amine ratio in the nickel complex is two, nickel being a divalent metal there will be no appreciable pH change accompanying the reduction. However, this exact condition is hard to meet. Accordingly, a good practice is to add ammonia in amount sufficient to insure a complex having a "ratio" of more than about 1.5 but less than about 2.5, even though reduction can be carried out at higher ratios. However, as nickel precipitates, the nickel:cobalt ratio decreases also, and optimum at lower nickel:cobalt ratios is favored at lower amine:metal ratios. Accordingly, a more desirable practice is to start with an initial amine:metal ratio just below two and as noted above, let the ratio decrease. To obtain a desirable 1.9:1 amine:nickel ratio will usually require supplying about two, or a little higher, mols of ammonia per mol of initially dissolved metal above that required for any acid neutralization, since cobalt has a somewhat greater affinity for the amine than does nickel. The reduction can then be started if necessary adjustments can be made in the total ammonia addition during the progress of the reaction. In later stages for subsequent metal products the amine:metal ratio may and usually should be increased, as will be discussed.

A desirable solution for a first stage metal reduction in the present process should be a slightly acidic to basic aqueous solution of the cobalt and nickel salts containing the complexing amine. A good working practice for economical reasons is to use as nearly saturated solutions as can be conveniently obtained. The dissolved metal content will depend on the solubility of the particular salt. In fact not all of the salt need be in solution when reaction is started. However, it should all be in solution when the first metal product is separated from the accompanying liquor.

In addition, the solution should contain a corresponding ammonium salt. Preferably there should be at least one-half mol of amine salt per mol of cobalt to give adequate cobalt solubility without excessive NH₃ addition. In the absence of the ammonium salt, cobalt hydroxide or basic sulfate is likely to precipitate if the free NH₃ is within the preferred range of 1.5 to 2.5 mols/mol of nickel plus cobalt. In the case of sulfates, for example, ammonium sulfate may be present in larger amounts so long as the solution is basic. However, more than about two mols of ammonium sulfate per liter adversely effects both the nickel reduction rate and the physical nature of the product and will seldom be present.

Much less than the noted amounts of the several salts may be used. For the illustrative sulfate case, a good average solute content range is about one mol of ammonium sulfate and from about one to about one and one-half mols of dissolved cobalt plus nickel per liter.

Accordingly, the first actual step in the present process is shown as a solution adjustment. For the illustrative case, metal sulfates and/or ammonium sulfate and/or ammonia and/or sulfuric acid and if necessary water, are added to bring the solution to approximately the conditions outlined in the foregoing discussion.

The next step is shown as a first nickel reduction. Herein, the adjusted solution is treated under reducing conditions. Temperatures of at least about 275° F. are required and above about 300° F. are needed to complete the cycle in a reasonable time. On the other hand, excessive temperatures, requiring pressures above about 1000 pounds per sq. in. are undesirable. They are not necessary, unduly increase the apparatus requirements and increase the tendency of cobalt to precipitate with the nickel. About 275°–400° F. is a good working range, with an average at about 350° F.

A reducing gas to be suitable must be non-sulfidizing. Hydrogen, carbon monoxide and mixtures of them may be used. Diluent inert gases or vapors do not harm except to unduly increase the requisite total pressures. If possible they should be avoided. Carbon monoxide forms carbonyl compounds which are both poisonous and reduce poorly, thus requiring special handling. Hydrogen, where available, is therefore much to be preferred. It may be added above or below the liquid surface before and/or during treatment.

Reduction may be either continuous or batch-wise, using controlled content solutions and conditions. In batch operation a timed cycle may be used. For any given solution a few trial runs will determine a time cycle which will stop reduction before the cobalt content of the nickel powder becomes sufficient to be uneconomical. For continuous operations, a few initial adjustments will establish the conditions at which the necessary feed rate may be maintained and the desired recovery obtained. In some cases, a particular metal mixture may be desired, for making certain alloys. In that case a higher cobalt content can be permitted, up to the desired one.

The precipitated metal is filtered out, washed and dried, as shown. Preferably, at least the final drying stages should be carried out in a reducing atmosphere. Product metal powder will be nickel in high-purity. Any solids-liquid separation may be substituted for filtration. Washing and drying are conventional.

The washings, while dilute, contain valuable materials. These are recovered as by recycling, by crystallizing of the salts content, by distillation and absorption of ammonia, and the like. These may be conventionally done and, therefore, form no part of the present process.

Filtrate is passed to a second nickel reduction. Here it is retreated under slightly more drastic conditions until the further precipitation of nickel is practically nil. While this nickel stripping is necessary, during this operation concomitant cobalt precipitation should be minimized. Temperatures slightly higher than in the first stage, but not excessive should be used. From about 300°–425° F. with an average of about 375°–400° F. is a good practice. A higher value of "x" in the complex ion is desirable, usually from about 2.5 to about 4 is a good practice although it may be desirable to go somewhat higher.

In many cases, the total weight of metal precipitated in this step will be small. It is filtered out, as was the first nickel product. It may be used in the copper cementation step if one is to be used. The washings are also treated similarly to the nickel powder washings to recover any useful constituents.

However, since cobalt is more valuable than nickel, it is usually economically advantageous to recycle this product. It is, therefore, usually redissolved and recycled, the nickel content thereof reporting eventually in a nickel powder product and the cobalt in a cobalt product. In such a case, washing and drying may be omitted, as shown by the dotted line.

Addition of more ammonia to the filtrate from this cycle, enough to raise the value of "x" in the Me(Am)$_x$ complex to about 4–6 or higher, is desirable for cobalt reduction, which is shown as the next step. Here, under still higher temperature, i. e., above about 425° F., a high grade cobalt product will be obtained which will be saleable as such. Temperatures above about 500° F. are usually not required but may be used. Reduction is ordinarily carried out to the extent that the solution becomes barren of cobalt for all practical purposes.

Cobalt product is collected, washed and dried as were preceding products. The washings too are similarly processed. However, the filtrate, because of its ammonium sulfate content, cannot be directly discarded. Acccordingly, it may be sent to a crystallization plant where ammonium sulfate is crystallized in some conventional manner as by water removal. Any unneutralized ammonia in this liquor is either neutralized with acid to produce more salt or is recycled. The exact method of ammonia recovery or recycling is not a feature of the present invention and has not been shown.

It was stated above that certain compounds other than sulfates can be treated by this process. Sulfates can be taken up in water, the oxides or hydroxides in sulfuric acid. Carbonates may be taken up in either acid or ammoniacal liquors. If so desired, carbonates may be converted to oxides by calcining and then treated. Ammoniacal solutions may be used in which the anion is wholly or in part chloride, nitrate, phosphate, acetate, or any other anion that does not, like permanganate, react with the reducing gas or form, as does cyanide, a practically undissociated complex.

The operation of the present process will be further discussed in conjunction with the following illustrative examples. Except as noted, all parts are expressed in mols per liter, percentages by weight, temperature in degrees Fahrenheit and the abbreviation "p. s. i." is used to designate pounds pressure per square inch gauge.

*Example 1*

In order to illustrate the three stage procedure on a material high in cobalt, about one part of a crystal mixture of cobalt and nickel sulfates having a nickel:cobalt mol ratio of about 4:5, obtained from ore leach liquors previously treated to recover copper, are dissolved in water together with about 1.2 parts of ammonium sulfate. The acidity of the solution is then about pH 4.5. The slurry is transferred to a stirred autoclave and treated with about 100 grams of nickel powder per liter, 2 mols of $NH_3$ per mol of metal and sufficient hydrogen to maintain a total pressure of about 800 pounds p. s. i. at about 350° F. Treatment at temperatures varying from about 320°–400° F., is conducted for about one-half hour and stopped. Up to 40% of the nickel is precipitated as metal powder containing less than 2% of the cobalt. In a second treatment, using up to 0.5 additional parts of $NH_3$, most of the balance of the nickel is co-precipitated with cobalt at 350°–425° F. in a fraction having about the original ratio. Finally, in a third treatment at above about 400° F., about 40–50% of the cobalt is recovered in a fraction containing about 3–6% of the nickel.

It should be noted that in the foregoing example and discussion, ammonia is used to form the metal complex. However, substituted amines may be used. Ethyl amine, ethylene diamine and similar homologues can be used. Physically, the extent to which the separation can be carried out may be increased by their use. Whether this is desirable or not depends on whether the economy of better product versus cost of amine works out favorably for the particular source material. Use of these materials is shown in the followings examples.

*Example 2*

Example 1 is repeated, omitting the ammonium sulfate and ammonia on a solution containing 0.7 mol of $CoSO_4$, 0.55 mols of $NiSO_4$ and 4.7 mols of ethylene diamine and 1 mol of $H_2SO_4$ per liter. Using about 400 grams per liter of minus 150 mesh nickel powder as seed, up to 60% of the nickel is recovered at less than 2% of the cobalt content. Up to 70% of the cobalt is recovered containing less than 0.5% nickel.

These examples illustrate the treatment of a feed in which the cobalt content is high enough to require a three stage treatment and about the upper limit for effective treatment. Processing of feeds having a higher nickel:cobalt ratio are illustrated in the following examples.

*Example 3*

Example 2 is repeated on a solution containing about 1 mol per liter of mixed cobalt and nickel sulfates in a nickel:cobalt ratio of about 4:1. Almost complete nickel precipitation is obtained in a powder containing less than 1% cobalt. No "second" or co-precipitation step is carried out. In the final, or cobalt, precipitation step, about 95% of the cobalt is recovered containing less than 5% nickel.

*Example 4*

Example 1 is repeated as to the first and last precipitation stages only on a sample of sulfates from a different ore having a nickel:cobalt mol ratio of about 20:1. In different tests, about 85–90% of the nickel is precipitated in the first stage, with a cobalt content of less than 0.5% and up to 95–97% with a cobalt content of about 1%. In the final precipitation on the liquor from the first stage with 0.5 part of additional $NH_3$, 75–80% of the cobalt is obtained. This product, due to the low nickel content of the solution passed to the final precipitation, while containing the bulk of the cobalt is actually in grade a middling product having a ratio from about 1:1 to about 1:3 and is small on a weight basis. It can be sold as such or reprocessed in separate circuit.

Several general variations in the overall flow scheme may be justified in treating certain types of materials. As noted above, the separation process of the present invention may either be one of removing the bulk of the nickel directly as the principal product from feeds of high nickel-cobalt ratio as in Example 4 or may be one of recovering part of the nickel and cobalt at improved ratios in each of the first and final products as in Examples 1 and 2. In the latter cases the middlings is recycled at about the original ratio. Accordingly, the proportion of nickel which can be precipitated sufficiently free of cobalt will vary with the initial Ni:Co mol ratio. If the ratio is high, as in Example 3, the first precipitate will comprise the major portion of the nickel. In that case, the "second" nickel reduction step may be omitted as discussed and shown in the drawing as a dotted optional flow line. The bulk of the cobalt with some nickel can be taken as a cobalt precipitate directly in a final precipitate. When the ratio is very high, as in Example 4, this product may be so small in amount that taking it as a product may not be economical. If so desired, it may be readily stripped of both metals by some other process such as adding a soluble sulfide and precipitating the insoluble cobalt and nickel sulfides. These may be collected and treated in a separate circuit when a sufficient amount has accumulated. A similar treatment may be applied to all liquors after taking the final product, but before ammonium sulfate separation, if so desired.

On the other hand, the initial Ni:Co mol ratio may in some cases be low. In that case, only a small proportion, i. e., of the nickel, may be capable of precipitation without an excessive cobalt content. It is usually more economical, therefore, to omit the first nickel reduction, passing directly to the "second" stage. There a middling or co-precipitate of most of the nickel, together with cobalt is made. The residual solution is processed for a cobalt product in the usual way. However, the nickel-cobalt co-precipitate, having a much higher Ni:Co ratio than the original one, is recycled. In this second pass, in a succeeding cycle or in a separate circuit, a higher percentage of nickel product can be produced in the first stage of a three-stage process. Such a flow is also shown by a dotted line.

Although it does not form part of the present invention, use of seed metal powder in the metal precipitation steps is highly advantageous. Its effect is definite, somewhat catalytic, even though its mode of operation is uncertain. A good yield with no tendency to foil formation, deposition on the vessel, or liquor occlusions is obtained.

Use of powder is particularly helpful in the case of nickel. When used, it should be finely divided, below 40 mesh and preferably below about 150 mesh.

It may be used in large amounts, since it represents no loss. As much should be used as is convenient, up to the amount which can be well dispersed and suspended by the agitator with which the vessel should be equipped. This may be a weight equal to the amount of metal precipitated or even several times this weight. A useful possibility lies in using it to absorb the reducing gas before actual metal reduction. This serves two useful functions. It provides a method of selectively removing hydrogen, for example, from a gas mixture so that inert gases need not be added to the pressure vessel and lower total pressures may be used. In addition, by absorbing a definite amount it provides a control of the amount of metal precipitated.

We claim:

1. In the hydrometallurgical separation of substantially nickel-free cobalt metal powder from mixtures containing soluble compounds of both thereof, the steps of: preparing therefrom an aqueous solution containing dissolved cobalt and nickel values; at from about 275° F. to about 400° F., treating the solution with a non-sulfidizing reducing gas and a sufficient amount of complex-forming ammine to produce in solution a mol ratio of unneutralized ammine to dissolved cobalt plus nickel, of from about 1.5 to about 4; whereby nickel metal powder is precipitated; continuing the treatment until precipitation of the nickel is substantially complete; removing nickel precipitate; adding to the residual solution sufficient ammine to produce an unneutralized ammine to dissolved cobalt ratio above about 4 and subjecting the so-adjusted solution to further reduction under a higher average temperature, whereby cobalt is precipitated, and collecting cobalt precipitate.

2. A process according to claim 1 in which the solution is a sulfate solution.

3. A process according to claim 2 in which the ammine is ammonia and the ammine to metal ratio is about 1.5–3 in the nickel precipitation step.

4. A process according to claim 2 in which the solution contains at least one-half mol of ammonium sulfate for each mol of cobalt.

5. A process according to claim 2 in which the solution contains at least one-half mol of ammonium sulfate for each mol equivalent of cobalt and the ammine is ammonia.

6. In the hydrometallurgical separation of substantially cobalt-free nickel and substantially nickel-free cobalt metal powders from mixtures containing soluble compounds of both thereof, the steps of: preparing therefrom an aqueous solution containing dissolved cobalt and nickel values; at from about 275° F. to about 400° F., treating the solution with a non-sulfidizing reducing gas and a sufficient amount of complex-forming ammine to produce in solution a mol ratio of unneutralized ammine to dissolved cobalt plus nickel, of from about 1.5 to 2.5; whereby substantially cobalt-free nickel metal powder is precipitated; stopping the reduction; removing nickel precipitate; at about 300°–425° F., subjecting the residual liquor to a second reduction in which the unneutralized ammine to dissolved cobalt plus nickel ratio is from about 2.5 to about 4 until precipitation of nickel is substantially complete; removing second precipitate; adding to the residual solution sufficient ammine to produce an unneutralized ammine to dissolved cobalt ratio above about 4 and subjecting the so-adjusted solution to a third reduction at above about 400° F. until precipitation of cobalt substantially ceases and collecting product cobalt.

7. A process according to claim 6 in which the solution is a sulfate solution.

8. A process according to claim 6 in which the solution contains at least one-half mol of ammonium sulfate for each mol equivalent of cobalt.

9. A process according to claim 6 in which the solution contains at least one-half mol of ammonium sulfate for each mol equivalent of cobalt and the ammine is ammonia.

10. A process according to claim 6 in which the second reduction is carried out in the presence of sufficient available ammine to increase said ratio to above about three.

11. In the separation of high purity nickel metal powder from mixtures containing soluble compounds thereof and of cobalt, the steps of: preparing an aqueous solution containing dissolved cobalt and nickel values; at from about 275° F. to about 400° F., treating the solution with a non-sulfidizing reducing gas and a sufficient amount of complex-forming ammine to product in solution a mol ratio of unneutralized ammine to dissolved cobalt plus nickel, of from about 1.5 to 3; whereby nickel metal powder is precipitated; stopping the reduction; removing nickel precipitate.

12. A process according to claim 11 in which the solution is a sulfate solution.

13. A process according to claim 12 in which the ammine is ammonia.

References Cited in the file of this patent

UNITED STATES PATENTS

| Number | Name | Date |
|---|---|---|
| 1,686,391 | Muller et al. | Oct. 2, 1928 |
| 1,783,662 | Marx et al. | Dec. 2, 1930 |